United States Patent
Frunza (10) Patent No.: US 11,431,472 B1
(45) Date of Patent: Aug. 30, 2022

(54) AUTOMATED DOMAIN LANGUAGE PARSING AND DATA EXTRACTION

(71) Applicant: MORGAN STANLEY SERVICES GROUP INC., New York, NY (US)

(72) Inventor: Magdalena Oana Frunza, Ottawa (CA)

(73) Assignee: Morgan Stanley Services Group Inc., New York, NY (US)

(*) Notice: Subject to any disclaimer, the term of this patent is extended or adjusted under 35 U.S.C. 154(b) by 0 days.

(21) Appl. No.: 17/532,818

(22) Filed: Nov. 22, 2021

(51) Int. Cl.
| H04L 9/06 | (2006.01) |
| G06N 20/00 | (2019.01) |
| H04L 41/16 | (2022.01) |
| G06N 3/08 | (2006.01) |
| G06F 16/28 | (2019.01) |
| G06F 8/33 | (2018.01) |
| G06F 40/279 | (2020.01) |

(52) U.S. Cl.
CPC ............ *H04L 9/0618* (2013.01); *G06F 16/28* (2019.01); *G06N 3/084* (2013.01); *G06N 20/00* (2019.01); *H04L 41/16* (2013.01); *G06F 8/33* (2013.01); *G06F 40/279* (2020.01)

(58) Field of Classification Search
CPC ..... H04L 9/0618; G06F 16/28; G06F 21/606; G06F 21/62; G06F 40/279; G06F 16/3344; G06F 8/33; G06F 8/36; G06F 40/274; G06F 8/35; G06N 20/00; G06N 3/084; G06N 3/08; G06N 3/0454
See application file for complete search history.

(56) References Cited

U.S. PATENT DOCUMENTS

| 10,770,180 B1 | 9/2020 | Kemp et al. |
| 10,771,529 B1 | 9/2020 | Shevchenko et al. |
| 10,817,650 B2 | 10/2020 | McCann et al. |
| 2016/0132648 A1 | 5/2016 | Shah et al. |
| 2017/0214521 A1* | 7/2017 | Busch .................. H04L 9/0618 |
| 2018/0203852 A1 | 7/2018 | Goyal et al. |
| 2018/0232443 A1 | 8/2018 | Delgo et al. |
| 2019/0034416 A1 | 1/2019 | Al Hasan et al. |
| 2019/0043379 A1 | 2/2019 | Yuan et al. |
| 2019/0122145 A1 | 4/2019 | Sun et al. |
| 2019/0197109 A1 | 6/2019 | Peters et al. |
| 2020/0012938 A1 | 1/2020 | Malhotra et al. |
| 2020/0065374 A1 | 2/2020 | Gao et al. |
| 2020/0218856 A1 | 7/2020 | Narayan et al. |

(Continued)

*Primary Examiner* — Kyung H Shin
(74) *Attorney, Agent, or Firm* — Weitzman Law Offices, LLC (57) ABSTRACT

A system for named entity extraction from a stream of semi-structured communications is disclosed. The system comprises a server connected to a network through which the stream of semi-structured communications is transmitted. The server is configured to receive at least one communication from the stream of semi-structured communications, divide the at least one communication into a set of individual characters, and for each individual character, generate a vector of values associated with the individual character. Once generated, the server passes each generated vector through an encoder-decoder transformer architecture; and based on output of the encoder-decoder transformer architecture, extracts a plurality of values associated with entities in the at least one communication.

19 Claims, 5 Drawing Sheets

(56) References Cited

U.S. PATENT DOCUMENTS

| | | |
|---|---|---|
| 2020/0334416 A1 | 10/2020 | Vianu et al. |
| 2021/0089624 A1 | 3/2021 | Bealby-Wright et al. |
| 2021/0201144 A1 | 7/2021 | Jonnalagadda et al. |
| 2021/0216728 A1 | 7/2021 | Hashimoto et al. |
| 2021/0224686 A1* | 7/2021 | Krishnamurthy ...... G06N 20/00 |
| 2021/0357187 A1* | 11/2021 | Clement ................ G06N 3/084 |

* cited by examiner

AUTOMATED DOMAIN LANGUAGE PARSING AND DATA EXTRACTION

FIELD OF INVENTION

This disclosure relates to systems and methods for computational linguistic analysis, and more specifically, to systems and methods for monitoring a stream of communications using a non-standard syntax regarding a particular subject domain, and performing named entity recognition or extracting other information from the communications.

BACKGROUND

In many industries and non-industrial activities, individuals have developed extremely information-dense methods of communication, especially where time or space are at a premium. In media for transmitting spoken language, the users of ham radio, citizens band (CB) radio over a trucking fleet, auctioneers soliciting bids at an auction, or pilots communicating with each other or with air traffic control may use various abbreviations, jargon, and codes to minimize the time spent on a communications band that must be shared in common among many users. In written media, various sequential forms of logging may similarly use abbreviations, jargon, and codes to minimize the space needed to encode important data, including medical records, meteorological measurements, records of asset transfers or offers to transfer, or records of games (such as the series of moves made during a game of chess or Diplomacy).

Individuals may wish to perform bulk data analysis on information encoded and transmitted or stored in these media, and seek to extract the information and give it semantic meaning based on what is known about the syntax. However, particular characteristics or flexibility of communication in a particular activity's standard may make the use of regular expressions or string keyword search infeasible for reliably identifying encoded information.

Thus, there are advantages to having a system that can read as input a stream of text-based electronic communications (or a textual transcript of communications in an unwritten medium) and that can reliably extract information that the originator of the communications intends to convey to the listener(s) or reader(s).

SUMMARY OF THE INVENTION

A system for named entity extraction from a stream of semi-structured communications is disclosed. The system includes a server connected to a network through which the stream of semi-structured communications is transmitted. The server is configured to receive at least one communication from the stream of semi-structured communications, divide the at least one communication into a set of individual characters, and for each individual character, generate a vector of values associated with the individual character. Once generated, the server passes each generated vector through an encoder-decoder transformer architecture; and based on output of the encoder-decoder transformer architecture, extracts a plurality of values associated with entities in the at least one communication.

Similarly, a computer-implemented method for named entity extraction from a stream of semi-structured communications is disclosed. The method includes receiving at least one communication from the stream of semi-structured communications; dividing the at least one communication into a set of individual characters; for each individual character, generating a vector of values associated with the individual character; passing each generated vector through an encoder-decoder transformer architecture; and based on output of the encoder-decoder transformer architecture, extracting a plurality of values associated with entities in the at least one communication.

Additional features of the above system and method include that the encoder-decoder transformer architecture is trained to receive a communication with entities in an arbitrary order unknown in advance and extract values of each entity accurately for any ordering, that multiple instances of an entity within a same communication are extracted, and that if the at least one communication does not contain an expected entity, output of the encoder-decoder transformer architecture includes a placeholder character or string to denote the expected entity that is absent.

An additional computer-implemented method for generating training data for a deep learning encoder-decoder transformer that extracts data from a plurality of communications is disclosed. The method comprises receiving a set of human-annotated training data; automatically identifying a possible variation to the training data that has a predictable effect on the output of the encoder-decoder system; and for each of one or more elements of the set of human-annotated training data, making a copy of that element, applying the variation to the copy, and inserting the varied copy into the training data. The variations may include changing entity values, re-ordering entities, removing entities, or some combination of two or more of these.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any embodiment), of which:

DETAILED DESCRIPTION

In order to address the limitations of other systems for parsing and named entity recognition, a method involving an encoder-decoder architecture using transformer neural networks is disclosed. The system aims to improve the extraction of particular entity values that are expected to be present in a communication or record, but are not guaranteed to be included in a particular order, nor with a particular syntax denoting and distinguishing them.

For example, a system for parsing medical records might seek to extract a patient's name, age or date of birth, gender, date of examination, weight, height, blood pressure, and pulse rate from a set of medical records that includes both "John Doe (1/2/70, M) came in on 10/29/21 and was 190 cm 195 # 120/80 65 bpm" and "2021-10-29: Jane Doe F51 55 kg 5'1" 120 sys 80 dia pulse 65". A rule-based parser will struggle heavily with the complications that a record may contain 5 slashes or none, may order the data differently, may use different symbols or abbreviations for the units associated with numbers, may use different numeric or datetime formats, may have entities (such as proper names) that contain spaces, etc.

Different subject matter domains may present differing problems to analysis. Communications or records may include numbers that are not associated with any textual clue and have significance only from their ordering or magnitude (such as 1/2/1970 being a day, month, and year: 120/80 being a systolic and diastolic blood pressure; or 38.8011, −77.0538 being a precise geographic location in latitude and longitude). Similarly, communications or records may include strings that have multiple possible significances depending on context (for example, in a financial system, "CS" could mean a ticker symbol for "Credit Suisse" or a classification of "Common Stock"). Use of spaces or punctuation may be absent or inconsistent (such that, for example, periods or commas may be used as part of a number, a terminator between entities, and/or a terminator between transmissions/sentences, all within the same communication and with the meaning of each instance relying on context).

Instead of assuming that the spaces or punctuation have significance and tokenizing an input text by splitting an input string into substrings along spaces or punctuation, ew-wry character is individually analyzed in its context via an encoder-decoder transformer neural network. By acting on individual characters in context, analysis may be much less prone to error in response to spelling differences or typographical errors, and can be agnostic as to differing formatting conventions implemented by punctuation or otherwise (such as the differing use of period and comma for a decimal separator or digit grouping character in Europe and the United States, or that elements of a date might be separated by a slash, hyphen, or other character). A misspelled word, instead of being treated as a completely different word from a word that is expected, instead becomes a set of characters that is mostly the same and likely retains the same relative ordering.

Although the use of encoder-decoder transformer neural networks is known in the field of automated translation from one natural language to another natural language, prior systems have not adapted them to use in named entity recognition or extraction more generally in the way described below. The named entity recognition/data extraction problem may be solved in part by re-conceptualizing the problem as one of translation from an arbitrarily complex and syntactically flexible language to a rigid artificial language more suitable for automated processing. That is, "2021-10-29: Jane Doe F51 55 kg . . . " could be seen as expressing the same semantic content as "Name: Jane Doe-|Gender: Female|Weight: 55 kg| . . . " in a different language—just as "Cogito ergo sum" expresses the same semantic content as "I think therefore I am." Many prior art systems rely on text being parsed by "chunking" it into words, and tagging each word according to an "inside, outside, beginning" (IOB) tagging scheme. However, instead of the present translation process converting from one vocabulary to another using a regimented IOB system, the translation process seeks to retain the same vocabulary, but select and extract the important data elements and re-arrange them from having an unpredictable syntax and/or inconsistent formatting into one so standardized that it is suitable for input into other software functions. As a result, the intake system for text does not need the same level of sophistication in parsing and tagging words to signal the exact position boundaries of each entity in an IOB format, and can pass the data on to an encoder-decoder system in a simpler format.

As a result of the improved processes described herein, error rates in named entity recognition and associating numeric values with expected fields in a communication decreased in some use cases from 15% with rule-based systems to 5.5% or less in the present system, while decreasing parsing time per communication by a factor of 10, from approximately two seconds in a sufficiently complex rule-based system to 0.2 seconds per communication in the present system.

Figure 1:
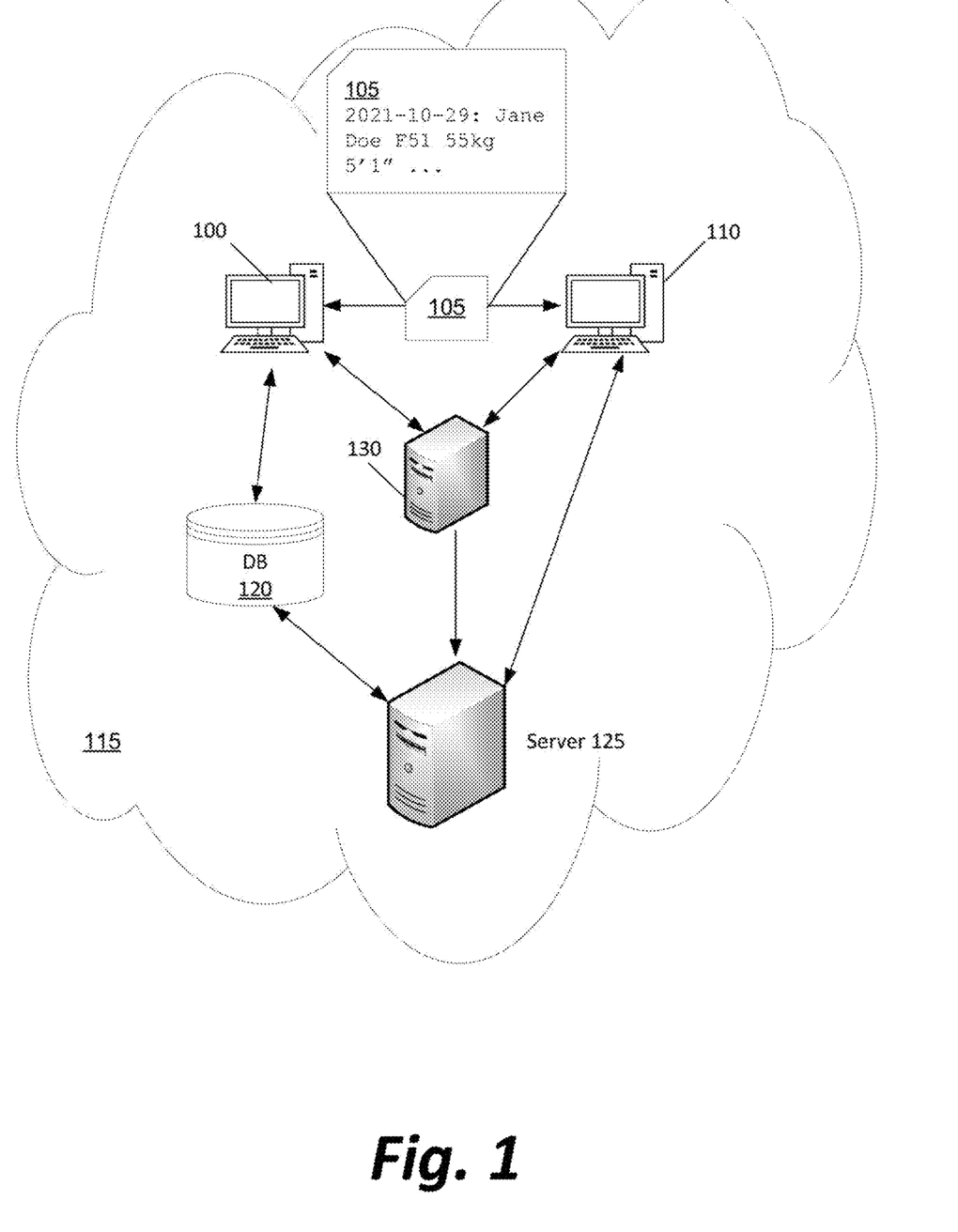
FIG. 1 illustrates, in simplified form, a system of computing devices used to create and/or capture a stream of communications for parsing.

FIG. 1 illustrates, in simplified form, a system of computing devices used to create and/or capture a stream of communications for parsing.

With reference now to FIG. 1, a user interface on a first computing device 100 may be used to transmit one or more communications 105 to a second computing device 110 via a computer network 115. The communications may be in a variety of media, including instant messages, e-mails, text messages (SMS), text files, structured database files, or any other format or protocol capable of containing textual content. Computer network 115 may be the Internet generally, a local area network (LAN), an ethernet, a Wi-Fi network, or any other means of connecting two computing devices.

In some embodiments, communications 105 may be transmitted in an analog format rather than a digital one (e.g., a radio transmission or a verbal utterance) that is picked up by a receiver or microphone associated with the first computing device 100 and that is transcribed to text for further processing.

In some embodiments, the data that will be parsed may not be a real-time communication from one individual to another, but rather a log or record that is stored for access by an unknown or hypothetical future reader. In such a case, a communication 105 may be generated on the first computing device 100 and remain there in local storage until retrieved at a later time, or may be stored directly in a database 120 for future querying.

In the preferred embodiment, after transmission of the one or more communications 105 from the first computing device 100 to the second computing device 110, the communications 105 is forwarded to a server 125. The forwarding may be accomplished by software on the first computing device 100, software on the second computing device 110, by a network node or router 130 that mediates communications between the two on the network 115 (e.g., if the router 130 transmits packets between them, or if the device is an IMAP server or other server that is necessary for the chosen communications medium to function).

In a preferred embodiment, the users of the first computing device 100 and the second computing device 110 use an instant messaging platform, such as Symfony, to communicate, and each instant message transmitted is also forwarded to the server 125 via action from a plugin installed on each of the users' Symfony installations.

After receipt of the communications 105, the server 125 runs software, described further below, to parse the communications and extract entity values. The extracted data may be forwarded to a database 120, to another computing device, or remain on the server 125 for further computation based on the extracted data.

Although a particular division of functions between devices is described with relation to the systems depicted in FIG. 1, above, other configurations are possible in which functions are divided among devices differently. For example, all of the functions of some or all of the server 125, database 120, and communications node or router 130 may be performed by a single device with multiple threads executing different software modules simultaneously.

Alternatively, each system or device from among server 125, database 120, and communications node or router 130 may in fact be a cluster of computing devices sharing functionality for concurrent processing. Further, although these various computing elements are described as if they are one computing device or cluster each, a cloud-based solution with multiple access points to similar systems that synchronize their data and are all available as backups to one another may be preferable in some embodiments to a unique set of computing devices all stored at one location. The specific number of computing devices and whether communication between them is network transmission between separate computing devices or accessing a local memory of a single computing device is not so important as the functionality that each part has in the overall scheme.

Figure 2:
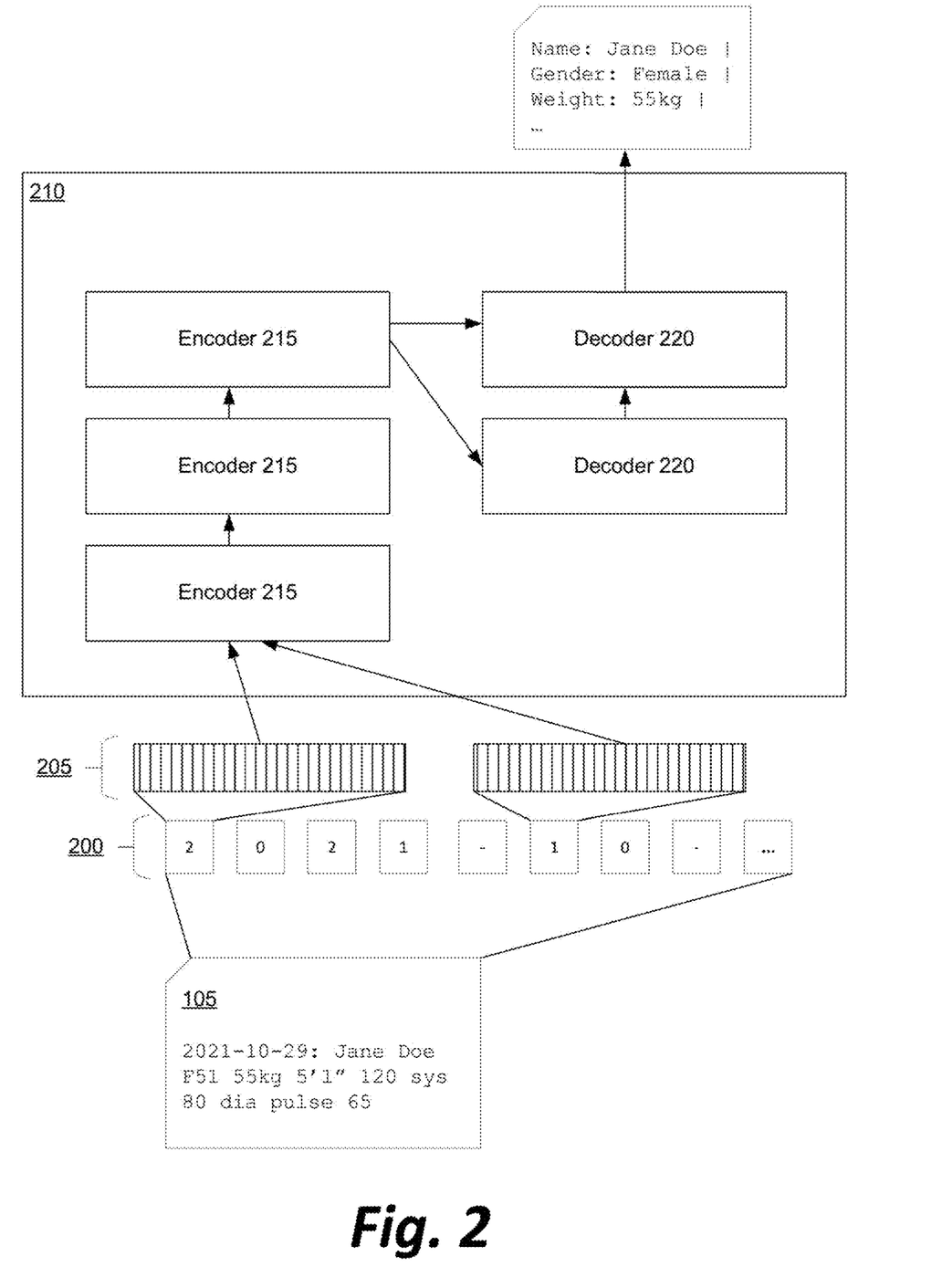
FIG. 2 illustrates a possible sample communication that might be received via the system of FIG. 1 and its analysis.

FIG. 2 illustrates a possible sample communication that might be received via the system of FIG. 1 and the logical steps in its analysis.

A communication 105 can be broken up into a series of individual characters 200, each of which are associated with a 300-dense-dimensional vector 205 to act as input to a deep learning transformer model 210. Many prior art transformers used in translation of natural languages involve a large number distinct neural layers (such as twelve encoders and twelve decoders). In contrast, in a preferred embodiment requires only three encoder layers 215 and two decoder layers 220 due to reduction in scope of the problem-instead of complete translation from one language to another, merely recognizing and rearranging possible entities already present. In a preferred embodiment, six attention heads are used to process in parallel and improve speed.

Figure 3:
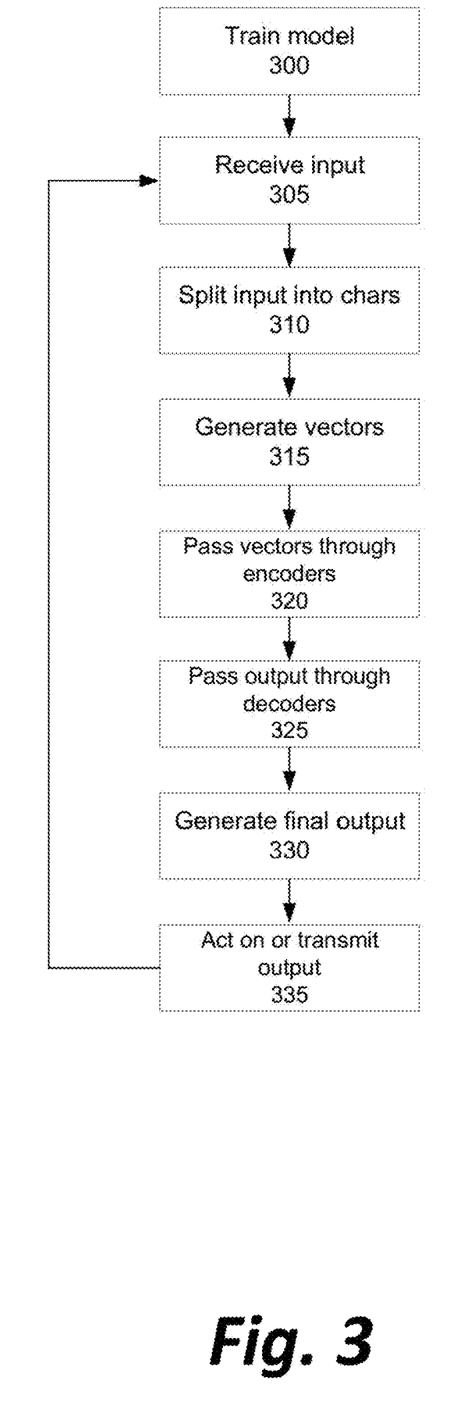
FIG. 3 illustrates, in simplified form, a method for automated analysis of communications to extract named entities and other information.

FIG. 3 illustrates, in simplified form, a method for automated analysis of communications to extract named entities and other information.

First, the transformer model must be trained (Step 300). In order to rapidly augment a training set for suitable data, a method, described further below in relation to FIG. 4, may be used. Regardless, the input weightings may be established via backpropagating errors through the layers of the neural network until the system has been trained to decide how to process inputs as they arrive.

Once the transformer model is properly trained, an input communication is received (Step 305) for parsing and extraction. The input is divided into individual characters (Step 310) and a dense multidimensional vector is generated for each character (Step 315), based on weightings in the neural network.

The set of multidimensional vectors are iteratively processed by the series of encoder layers of the transformer (Step 320), followed by a series of decoder layers (Step 325), where each decoder layer processes as input both the output of the last encoder layer and previous decoder layers.

After processing by the transformer architecture, output is generated (Step 330). In a preferred embodiment, the output is formatted such that each expected entity to be extracted is separated by a specific character, such as the pipe ("|"), semicolon, or another character that is not expected to be present in the extracted data. Entities that could not be successfully extracted (whether because of error or their absence in the input) might also be represented by a unique character, such as an equals sign ("="), exclamation point, or other character that is not expected to be present in the extracted data, or may instead be indicated by including nothing between two instances of a separator (such as "Name: Jane Doe|||Age: 51"). The use of an absent entity indicator aids in machine processing of the output since it makes it possible to guarantee that the output will have a predetermined ordering and a given entity will always be after the nth separator.

Additionally, if an input happens to be structured so that it contains multiple instances of a same entity type—for example, if a medical record has multiple blood pressures taken in a sequence, or if a record includes a set of locations, or a set of dates, or a set of names, etc.—then the output will extract each of these entities, using a different separator at this second level (for example, use of semicolons instead of vertical pipes in "Name: Jane Doe|Blood Pressures: 120/80; 130/90; 135/95|Age: 51").

After the output is generated, it is acted upon or transmitted to another computing device to be acted upon (Step 335). The nature of the action may depend on the specific problem domain. In a medical field context, a rule-based secondary system may respond to extracted data from a medical record to update a medical database, to generate medical advice for a patient, to generate an alert to a medical professional, and the like. In an air traffic control context, extracted data regarding contents of radio transmissions may be used to generate a graphical user interface showing information concerning the status and location of airplanes in flight, to generate alerts or alarms for pilots or traffic controllers, and the like. In a gaming context, extracted data regarding a series of moves may be parsed to generate an interface showing a current game state or status, to enable viewing or replay of a game, to translate a human's moves in a game to allow a computer opponent to respond, and the like. In a financial context, extracted data regarding an order quote may be used to update a financial model, to make or abstain from making a transaction, to update an interface showing market conditions, and the like. In a trucking fleet context, extracted data regarding communications from truck drivers over CB radio may be used to aid autonomous vehicles in selecting routes, to update a map of current locations of vehicles, to identify inefficiencies in use of a trucking fleet, and the like. In any event, regardless of the semantic meaning of the data or its context, it may be stored in a database for future analysis, used to update a graphical user interface adapted for displaying the data in a useful fashion, interpreted as a command to an automaton or identified as an issue requiring a response from an automaton, or to present information to a human user for further action.

Once any action or response has concluded, the transformer model receives another input communication (back to Step 305) and the server continues to process a stream of input so long as input is available.

Figure 4:
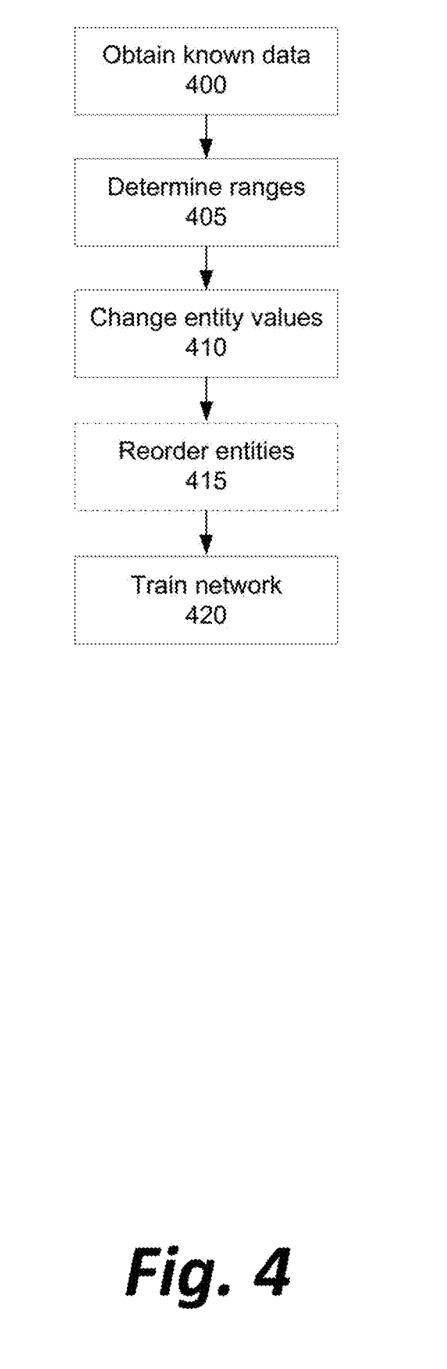
FIG. 4 illustrates, in simplified form, a method for generating training data to improve the reliability of a deep learning system.

FIG. 4 illustrates, in simplified form, a method for generating training data to improve the reliability of a deep learning system.

First, a system obtains a set of known samples of acceptable data for a given domain (Step 400). Continuing the example from above, these might include "John Doe (1/2/70, M) came in on 10/29/21 and was 190 cm 195 # 120/80 65 bpm" and "2021-10-29: Jane Doe F51 55 kg 5'1" 120 sys 80 dia pulse 65".

Next, a range or set of possible values is entered or determined for each entity to be captured (Step 405). For example, a human user may provide a range that a computer would have no way of intuiting (such as input indicating that a pulse can be any integer from 1 to 200), or the system itself may scan the set of samples and determine a set of possible values (such as determining that the gender field is always "M", "F", or "X" in the dataset).

Next, the data set is augmented to add new data by creating copies of existing data and changing one or more values for entities to another known potentially valid entry (Step 410). In the example above. "2021-10-29: Jane Doe F51 55 kg 5'1" 120 sys 80 dia pulse 65" might be copied and four additional entries created, one with a different date, one with a different age, one with a different gender, and one with a different pulse rate. The dataset can be made arbitrarily larger by including any number of variations with such substitutions. If variations are introduced according to a rule (such as the human-entered integer range) rather than only repeating values already seen in the data, the training of the neural net will be even more robust with less danger of overfitting the neural net to the training data set. The automated system need only be careful that the expected outputs from the new elements of the training data set are adjusted in accordance with the change.

In some embodiments, the extractor may intend to identify when an expected entity is missing. In those embodiments, variations to entity data may also include removing one or more entities entirely and noting that the expected output should include a "missing entity" indicator for each missing entity. As a result, the input "F51 55 kg 5'1" 120 sys 80 dia pulse 65" might be associated with the expected output "Name: =|Date: =|Gender: Female| . . . " to indicate that the output should notice when a name or date is missing.

Next, the system can optionally further generate additional new data by creating copies of training data and re-ordering their elements (Step 415). For example, if "2021-10-29: Jane Doe F51 55 kg 5'1" 120 sys 80 dia pulse 65" is in the training set, an additional entry that re-orders the elements to read "Jane Doe 120 sys 80 dia 2021-10-29: pulse 65 F51 5'1" 55 kg" might be added to the training data set. Training on various orderings of data will tend to make the neural net far more robust with respect to syntax and the unpredictable order of incoming data. Further, they are simple for the automated system to implement as the re-ordering of elements will not change what entities and values are to be extracted.

Because both the entity value change and the optional re-ordering steps can potentially increase the size of the training data set by multiple orders of magnitude, it is simple to leverage a smaller, human-curated training set into a much larger data set that is effective for training a neural net. A few hundred human-annotated training data elements may be transformed into millions of plausible, synthetic data elements to aid in training neural networks without excessive human labor spent generating the plausible data.

Finally, the data set is fed into the neural network for training (Step 420). As more data is provided, the weights on neurons of the network are refined and the overall accuracy of the extraction system is improved.

Although FIG. 1 depicts a preferred configuration of computing devices and software modules to accomplish the software-implemented methods described above, those methods do not inherently rely on the use of any particular specialized computing devices, as opposed to standard desktop computers and/or web servers. For the purpose of illustrating possible such computing devices, FIG. 5, below, describes various enabling devices and technologies related to the physical components and architectures described above.

Figure 5:
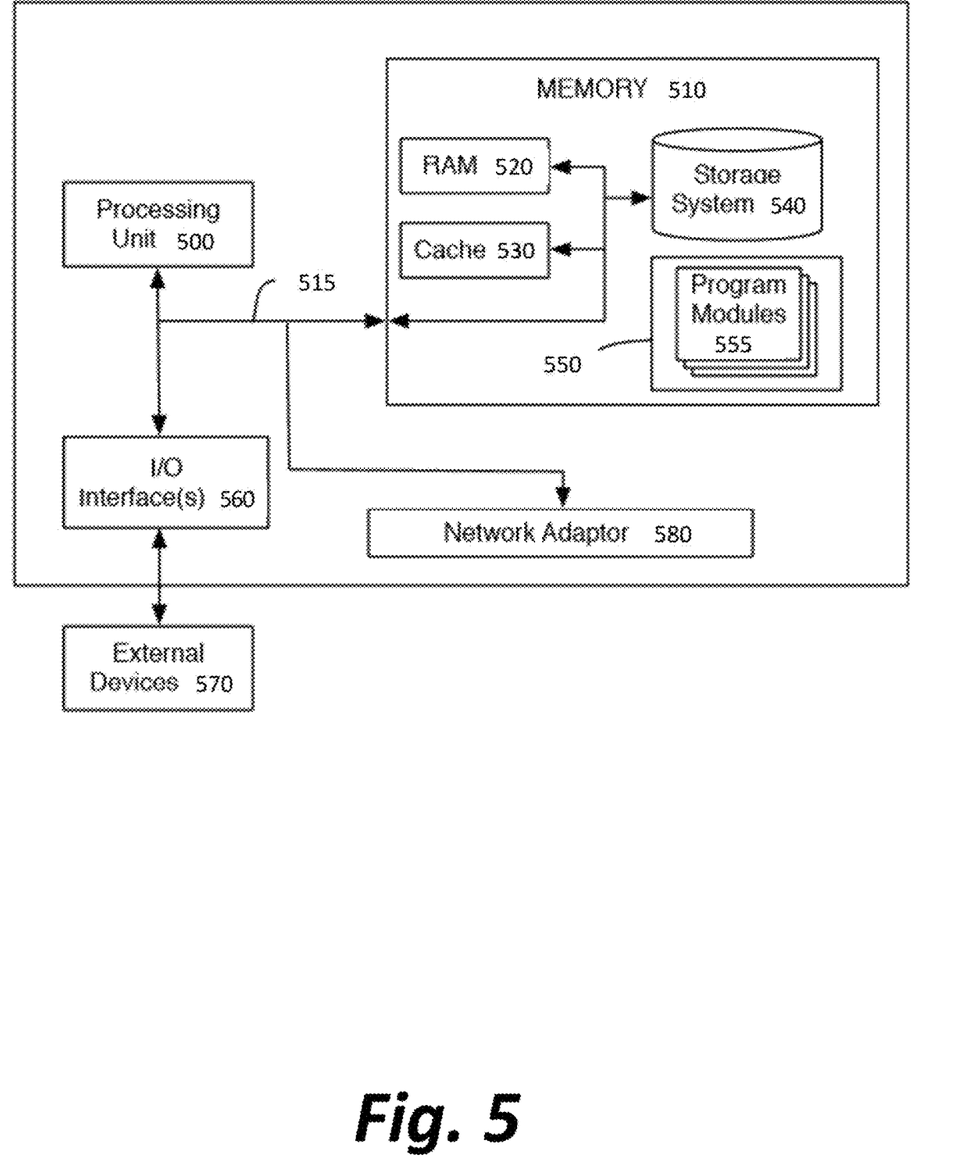
FIG. 5 is a high-level block diagram of a representative computing device that may be utilized to implement various features and processes described herein.

FIG. 5 is a high-level block diagram of a representative computing device that may be utilized to implement various features and processes described herein, for example, the functionality of the first computing device 100, the second computing device 110, the database 120, the server 125, the communications node 130, or any other computing device described. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 5, the computing device is illustrated in the form of a special purpose computer system. The components of the computing device may include (but are not limited to) one or more processors or processing units 500, a system memory 510, and a bus 515 that couples various system components including memory 510 to processor 500.

Bus 515 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Component Interconnect (PCI) bus.

Processing unit(s) 500 may execute computer programs stored in memory 510. Any suitable programming language can be used to implement the routines of particular embodiments including C. C++, Java, assembly language, etc. Different programming techniques can be employed such as procedural or object oriented. The routines can execute on a single computing device or multiple computing devices. Further, multiple processors 500 may be used.

The computing device typically includes a variety of computer system readable media. Such media may be any available media that is accessible by the computing device, and it includes both volatile and non-volatile media, removable and non-removable media.

System memory 510 can include computer system readable media in the form of volatile memory, such as random access memory (RAM) 520 and/or cache memory 530. The computing device may further include other removable/non-removable, volatile/non-volatile computer system storage media. By way of example only, storage system 540 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 515 by one or more data media interfaces. As will be further depicted and described below, memory 510 may include at least one program product having a set (e.g., at least one) of program modules that are configured to carry out the functions of embodiments described in this disclosure.

Program/utility 550, having a set (at least one) of program modules 555, may be stored in memory 510 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 570 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 560.

In addition, as described above, the computing device can communicate with one or more networks, such as a local area network (LAN), a general wide area network (WAN) and/or a public network (e.g., the Internet) via network adaptor 580. As depicted, network adaptor 580 communicates with other components of the computing device via bus 515. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may use copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for named entity extraction from a stream of semi-structured communications, comprising:
    a server connected to a network through which the stream of semi-structured communications is transmitted, wherein the server comprises one or more processors, and non-transitory memory comprising instructions that, when executed by the one or more processors, cause the one or more processors to:
        receive at least one communication from the stream of semi-structured communications, the at least one communication comprising more than one expected numerical entity or non-numerical entity according to a structure of the semi-structured communications;
        divide the at least one communication into a set of individual characters;
        for each individual character, generate a vector of values associated with the individual character, the values of the vector being determined based at least in part on training results of an encoder-decoder transformer architecture;
        pass each generated vector through the encoder-decoder transformer architecture; and
        based on output of the encoder-decoder transformer architecture, extract a plurality of values associated with the expected numerical entities or non-numerical entities in the at least one communication.

2. The system of claim 1, wherein the encoder-decoder transformer architecture comprises three or fewer encoder layers.

3. The system of claim 1, wherein the encoder-decoder transformer architecture comprises two or fewer decoder layers.

4. The system of claim 1, wherein, if the at least one communication does not contain an expected entity, output of the encoder-decoder transformer architecture comprises a placeholder character or string to denote the expected entity that is absent.

5. The system of claim 1, wherein the encoder-decoder transformer architecture is trained to receive a communication with entities in an arbitrary order unknown in advance and extract values of each entity accurately for any ordering.

6. The system of claim 1, wherein if the at least one communication contains multiple instances of an entity, each instance of the entity is extracted.

7. The system of claim 1, wherein the encoder-decoder transformer architecture is agnostic to a significance of punctuation present in the at least one communication.

8. A computer-implemented method for named entity extraction from a stream of semistructured communications, comprising:
    receiving at least one communication from the stream of semi-structured communications, the at least one communication comprising more than one expected numerical entity or non-numerical entity according to a structure of the semi-structured communications;
    dividing the at least one communication into a set of individual characters;
    for each individual character, generating a vector of values associated with the individual character, the values of the vector being determined based at least in part on training results of an encoder-decoder transformer architecture;
    passing each generated vector through the encoder-decoder transformer architecture; and
    based on output of the encoder-decoder transformer architecture, extracting a plurality of values associated with the expected numerical entities or non-numerical entities in the at least one communication.

9. The method of claim 8, wherein the encoder-decoder transformer architecture comprises three or fewer encoder layers.

10. The method of claim 8, wherein the encoder-decoder transformer architecture comprises two or fewer decoder layers.

11. The method of claim 8, wherein, if the at least one communication does not contain an expected entity, output of the encoder-decoder transformer architecture comprises a placeholder character or string to denote the expected entity that is absent.

12. The method of claim 8, wherein the encoder-decoder transformer architecture is trained to receive a communication with entities in an arbitrary order unknown in advance and extract values of each entity accurately for any ordering.

13. The method of claim 8, wherein if the at least one communication contains multiple instances of an entity, each instance of the entity is extracted.

14. The method of claim 8, wherein the encoder-decoder transformer architecture is agnostic to a significance of punctuation present in the at least one communication.

15. The method of claim 8, wherein the encoder-decoder transformer architecture has been trained on data generated by a method comprising:
    receiving a set of human-annotated training data;
    automatically identifying a possible variation to the human-annotated training data that has a predictable effect on output of the encoder-decoder transformer architecture; and
    for each of one or more elements of the set of human-annotated training data, making a copy of that element, applying the variation to the copy, and inserting the varied copy into the training data along with the copied element, so that a number of training examples in the training data is increased.

16. The method of claim 15, wherein the possible variation is a change to a value of an entity in the set of human-annotated training data to another valid value for the entity.

17. The method of claim 15, wherein the possible variation is a re-ordering of entities in the set of human-annotated training data.

18. The method of claim 15, wherein the possible variation is a removal of one or more entities from the set of human-annotated training data.

19. The method of claim 15, wherein two or more possible variations are applied in sequence to elements of the set of human-annotated training data.

* * * * *